(12) United States Patent
Lv et al.

(10) Patent No.: US 12,223,721 B2
(45) Date of Patent: Feb. 11, 2025

(54) METHOD AND APPARATUS FOR VIDEO FRAME PROCESSING

(71) Applicant: Tencent Music Entertainment Technology (Shenzhen) Co., Ltd., Guangdong (CN)

(72) Inventors: Mengye Lv, Guangdong (CN); Zhi Dong, Guangdong (CN); Shenyuan Li, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 604 days.

(21) Appl. No.: 17/575,140

(22) Filed: Jan. 13, 2022

(65) Prior Publication Data
US 2022/0139085 A1    May 5, 2022

Related U.S. Application Data

(63) Continuation of application No. PCT/CN2019/114271, filed on Oct. 30, 2019.

(30) Foreign Application Priority Data

Jul. 18, 2019 (CN) .......................... 201910651319.3

(51) Int. Cl.
*G06V 20/40* (2022.01)
*G06F 16/783* (2019.01)
(Continued)

(52) U.S. Cl.
CPC ............ *G06V 20/48* (2022.01); *G06F 16/783* (2019.01); *G06V 10/761* (2022.01); *G06V 10/82* (2022.01); *G06V 20/41* (2022.01); *G06V 20/46* (2022.01)

(58) Field of Classification Search
CPC ..... G06F 16/75; G06F 16/783; G06V 10/454; G06V 10/761; G06V 10/82; G06V 20/41; G06V 20/46; G06V 20/48
See application file for complete search history.

(56) References Cited

U.S. PATENT DOCUMENTS

2011/0317923 A1* 12/2011 Hondo .................. G06F 16/583
382/190

FOREIGN PATENT DOCUMENTS

| CN | 101833650 A | * | 9/2010 |
| CN | 107229710 A | | 10/2017 |
| CN | 109543735 A | | 3/2019 |

OTHER PUBLICATIONS

CNIPA, International Search Report for International Patent Application No. PCT/CN2019/114271, Feb. 1, 2020, 6 bages.
(Continued)

*Primary Examiner* — Michael J Vanchy, Jr.
(74) *Attorney, Agent, or Firm* — IP Spring

(57) ABSTRACT

A method and an apparatus for video frame processing are provided. The method includes: obtaining a convolutional neural network (CNN) feature and a local feature of a target video frame; performing dimension reduction on the CNN feature to obtain a CNN feature with a reduced dimension of the target video frame; obtaining a first video frame from multiple sample video frames, a distance between a CNN feature with a reduced dimension of the first video frame and the CNN feature with the reduced dimension of the target video frame meets a first preset condition; obtaining a local feature of the first video frame; calculating a matching degree between the local feature of the first video frame and the local feature of the target video frame; determining the first video frame as a duplicate video frame of the target video frame if the matching degree meets a second preset condition.

20 Claims, 7 Drawing Sheets

(51) Int. Cl.
    *G06V 10/74*         (2022.01)
    *G06V 10/82*         (2022.01)

(56) References Cited

OTHER PUBLICATIONS

CNIPA, Written Opinion for International Patent Application No. PCT/CN2019/114271, Feb. 1, 2020, 3 pages.
Wang, Ling, "Content-Based Video Copy Detection," Chinese Master's Thesis Full-text Database, Information Science and Technology, Apr. 15, 2018, pp. 11-12 and 30-39.

* cited by examiner

METHOD AND APPARATUS FOR VIDEO FRAME PROCESSING

CROSS-REFERENCE TO RELATED APPLICATION(S)

This application is a continuation under 35 U.S.C. § 120 of International Application No. PCT/CN2019/114271, filed Oct. 30, 2019, which claims priority under 35 U.S.C. § 119(a) and/or PCT Article 8 to Chinese Application No. 201910651319.3, filed Jul. 18, 2019, the entire disclosures of which are hereby incorporated by reference.

TECHNICAL FIELD

This disclosure relates to the technical field of Internet, in particular to a method and an apparatus for video frame processing.

BACKGROUND

With the development of information technology, multimedia technology also came into being. Users can watch videos published by various video websites through the Internet, and users can also load videos to video websites.

In the process of realizing the invention, the inventor found that a large number of videos are stored in the video library of the existing video website. In order to avoid duplicate videos stored in the video library, duplicate videos are usually detected, and the detection of duplicate video frames is particularly important in the process of duplicate video detection.

SUMMARY

Implementations of the disclosure provides a method and an apparatus for video frame processing.

According to a first aspect, a method for video frame processing is provided. The method includes: obtaining a convolutional neural network (CNN) feature of a target video frame and a local feature of the target video frame, the local feature of the target video frame comprising a first key point of the target video frame and a feature descriptor corresponding to the first key point; performing dimension reduction on the CNN feature of the target video frame to obtain a CNN feature with a reduced dimension of the target video frame; obtaining a first video frame from multiple sample video frames, a distance between a CNN feature with a reduced dimension of the first video frame and the CNN feature with the reduced dimension of the target video frame meeting a first preset condition; obtaining a local feature of the first video frame, the local feature of the first video frame comprising a second key point in the first video frame and a feature descriptor corresponding to the second key point; calculating a matching degree between the local feature of the first video frame and the local feature of the target video frame; determining the first video frame as a duplicate video frame of the target video frame if the matching degree meets a second preset condition.

In one possible design, obtaining the CNN feature of the target video frame includes: obtaining a video to-be-queried; taking equal interval video screenshots of the video to-be-queried to obtain the target video frame, the target video frame is any of multiple video frames obtained by taking equal interval video screenshots of the video to-be-queried; obtaining the CNN feature of the target video frame by inputting the target video frame into a CNN for processing.

In one possible implementation, obtaining the first video frame from the multiple sample video frames: obtaining a CNN feature index of a sample video, the sample video comprising multiple sample video frames, the CNN feature index is indicative of multiple clusters formed by clustering of a CNN feature with a reduced dimension of the multiple sample video frames, each cluster comprising a cluster center and a CNN feature with a reduced dimension of at least one sample video frame in the cluster; calculating a distance between the CNN feature with the reduced dimension of the target video frame and the cluster center of each of the multiple clusters and determining a cluster with a cluster center having the shortest distance as a target cluster; calculating a distance between the CNN feature with the reduced dimension of the target video frame and a CNN feature with a reduced dimension of each of the at least one sample video frame included in the target cluster, and determining a sample video frame, which corresponds to a CNN feature with a reduced dimension having the shortest distance, as the first video frame.

In one possible implementation, the local feature of the target video frame includes m first key points and m first feature descriptors corresponding to the m first key points, one first key point corresponds to one first feature descriptor, the local feature of the first video frame includes n second key points and n second feature descriptors corresponding to the n second key points, one second key point corresponds to one second feature descriptor, m is a natural number greater than or equal to 2, and n is a natural number greater than or equal to 2.

Calculating the matching degree between the local feature of the first video frame and the local feature of the target video frame includes: for each first feature descriptor, obtaining a distance between each of the n second feature descriptors and the first feature descriptor to obtain n distances; sorting the n distances to form a sorting queue in order from large to small; obtaining last k distances in the sorting queue, k is a natural number greater than or equal to 2; determining that the first feature descriptor is an effective descriptor matching the first video frame, according to the k distances; determining the matching degree between the local feature of the first video frame and the local feature of the target video frame according to the number of effective descriptors in the m first feature descriptors.

In one possible implementation, the method further includes: before obtaining the CNN feature of the target video frame and the local feature of the target video frame, obtaining a CNN feature of the multiple sample video frames; performing dimension reduction on the CNN feature of the multiple sample video frames with a principal component analysis (PCA) matrix to obtain the CNN feature with the reduced dimension of the multiple sample video frames; performing k-means clustering on the CNN feature with the reduced dimension of the multiple sample video frames to form multiple clusters, each cluster comprising a CNN feature with a reduced dimension of at least one sample video frame; performing quantization compression on the CNN feature with the reduced dimension of the at least one sample video frame included in each cluster to obtain a compressed CNN feature corresponding to the cluster; generating the CNN feature index of the sample video according to the multiple clusters, the compressed CNN feature corresponding to each cluster, and the cluster center of each cluster.

In one possible implementation, the target video frame belongs to a video to-be-queried, a playing time point of the target video frame in the video to-be-queried is a first playing time point, and the first video frame belongs to a target video in a sample video.

Determining the first video frame as the duplicate video frame of the target video frame includes: obtaining a frame identifier (ID) of the first video frame; searching for a second playing time point in the target video corresponding to the frame ID of the first video frame, and determining a video frame at the second playing time point in the target video as a duplicate video frame of a video frame at the first playing time point in the video to-be-queried.

In one possible implementation, the method further includes: if the number of all duplicate video frames of the video to-be-queried and the target video is greater than a second threshold and duplicate video frames meeting a continuous distribution condition among all the duplicate video frames are distributed in a first time period of the video to-be-queried and a second time period of the target video, determining a video in the first time period of the video to-be-queried and a video in the second time period in the target video as duplicate video segments, the first time period includes the first playing time point, the second time period includes the second playing time point, and the continuous distribution condition includes that a time difference between adjacent duplicate video frames is less than the third threshold.

In a second aspect, an apparatus for video frame processing is provided. The apparatus for video frame processing includes a first obtaining module, a dimension reduction module, a second obtaining module, a third obtaining module, a calculating module, and a first determining module.

The first obtaining module is configured to obtain a convolutional neural network (CNN) feature of a target video frame and a local feature of the target video frame, the local feature of the target video frame comprising a first key point of the target video frame and a feature descriptor corresponding to the first key point.

The dimension reduction module is configured to perform dimension reduction on the CNN feature of the target video frame to obtain a CNN feature with a reduced dimension of the target video frame.

The second obtaining module is configured to obtain a first video frame from multiple sample video frames, a distance between a CNN feature with a reduced dimension of the first video frame and the CNN feature with the reduced dimension of the target video frame meeting a first preset condition.

The third obtaining module is configured to obtain a local feature of the first video frame, the local feature of the first video frame comprising a second key point in the first video frame and a feature descriptor corresponding to the second key point.

The calculating module is configured to calculate a matching degree between the local feature of the first video frame and the local feature of the target video frame.

The first determining module is configured to determine the first video frame as a duplicate video frame of the target video frame if the matching degree meets a second preset condition.

In one possible implementation, the first obtaining module is configured to: obtain a video to-be-queried; take equal interval video screenshots of the video to-be-queried to obtain the target video frame, the target video frame is any of multiple video frames obtained by taking equal interval video screenshots of the video to-be-queried; obtain the CNN feature of the target video frame by inputting the target video frame into a CNN for processing.

In one possible design, the second obtaining module includes a first obtaining unit, a first calculating unit, and a second calculating unit.

The first obtaining unit is configured to obtain a CNN feature index of a sample video, the sample video comprising the multiple sample video frames, the CNN feature index is indicative of multiple clusters formed by clustering of a CNN feature with a reduced dimension of the multiple sample video frames, each cluster comprising a cluster center and a CNN feature with a reduced dimension of at least one sample video frame in the cluster.

The first calculating unit is configured to calculate a distance between the CNN feature with the reduced dimension of the target video frame and the cluster center of each of the multiple clusters and determining a cluster with a cluster center having the shortest distance as a target cluster.

The second calculating unit is configured to calculate a distance between the CNN feature with the reduced dimension of the target video frame and a CNN feature with a reduced dimension of each of the at least one sample video frame included in the target cluster, and determining a sample video frame, which corresponds to a CNN feature with a reduced dimension having the shortest distance, as the first video frame.

In one possible implementation, the local feature of the target video frame includes m first key points and m first feature descriptors corresponding to the m first key points, one first key point corresponds to one first feature descriptor, the local feature of the first video frame includes n second key points and n second feature descriptors corresponding to the n second key points, one second key point corresponds to one second feature descriptor, m is a natural number greater than or equal to 2, and n is a natural number greater than or equal to 2.

The calculating module includes a second obtaining unit, a sorting unit, a third obtaining unit, a first determining unit, and a second determining unit. The second obtaining unit is configured to obtain, for each first feature descriptor, a distance between each of the n second feature descriptors and the first feature descriptor to obtain n distances. The sorting unit is configured to sort the n distances to form a sorting queue in order from large to small. The third obtaining unit is configured to obtain last k distances in the sorting queue, k is a natural number greater than or equal to 2. The third obtaining unit is configured to obtain last k distances in the sorting queue, k is a natural number greater than or equal to 2. The first determining unit is configured to determine, according to the k distances, that the first feature descriptor is an effective descriptor matching the first video frame. The second determining unit is configured to determine the matching degree between the local feature of the first video frame and the local feature of the target video frame according to the number of effective descriptors in the m first feature descriptors.

In one possible implementation, the apparatus further includes: a fourth obtaining module, a dimension reduction module, a clustering module, a quantization compression module, and a generating module. The fourth obtaining module is configured to obtain a CNN feature of the multiple sample video frames. The dimension reduction module is configured to perform dimension reduction on the CNN feature of the multiple sample video frames with a principal component analysis (PCA) matrix to obtain the CNN feature with the reduced dimension of the multiple sample video frames. The clustering module is configured to perform k-means clustering on the CNN feature with the reduced dimension of the multiple sample video frames to form multiple clusters, each cluster comprising a CNN feature with a reduced dimension of at least one sample video frame. The quantization compression module is configured to perform quantization compression on the CNN feature with the reduced dimension of the at least one sample video frame included in each cluster to obtain a compressed CNN feature corresponding to the cluster. The generating module is configured to generate the CNN feature index of the sample video according to the multiple clusters, the compressed CNN feature corresponding to each cluster, and the cluster center of each cluster.

In one possible implementation, the target video frame belongs to a video to-be-queried, a playing time point of the target video frame in the video to-be-queried is a first playing time point, and the first video frame belongs to a target video in a sample video. The first determining module includes a fourth obtaining unit and a third determining unit. The fourth obtaining unit is configured to obtain a frame identifier (ID) of the first video frame. The third determining unit is configured to search for a second playing time point in the target video corresponding to the frame ID of the first video frame, and determine a video frame at the second playing time point in the target video as a duplicate video frame of a video frame at the first playing time point in the video to-be-queried.

In one possible implementation, the apparatus further includes a second determining module. The second determining module is configured to determine a video in a first time period of the video to-be-queried and a video in a second time period in the target video as duplicate video segments if the number of all duplicate video frames of the video to-be-queried and the target video is greater than a second threshold and duplicate video frames meeting a continuous distribution condition among all the duplicate video frames are distributed in the first time period of the video to-be-queried and the second time period of the target video, the first time period includes the first playing time point, the second time period includes the second playing time point, and the continuous distribution condition includes that a time difference between adjacent duplicate video frames is less than the third threshold.

In a third aspect, an apparatus for video frame processing is provided. The apparatus for video frame processing includes a processor and a memory. The processor is coupled with the memory. The memory stores program codes. The processor is configured to invoke the program codes to perform the method of the first aspect.

In a fourth aspect, a non-transitory computer readable storage medium is provided. The computer storage medium stores computer programs. The computer programs include computer instructions which, when executed by the processor, cause to perform the method of the first aspect.

BRIEF DESCRIPTION OF THE DRAWINGS

In order to illustrate technical schemes in implementations of the disclosure or the related art, the following will briefly introduce the drawings required to be used in the description of the implementations or the related art.

DETAILED DESCRIPTION

Technical schemes in implementations of the disclosure will be described below in combination with the accompanying drawings in implementations of the disclosure.

The method for video frame processing according to implementations of the disclosure will be described below in detail with reference to FIG. 1 to FIG. 4.

Figure 1:
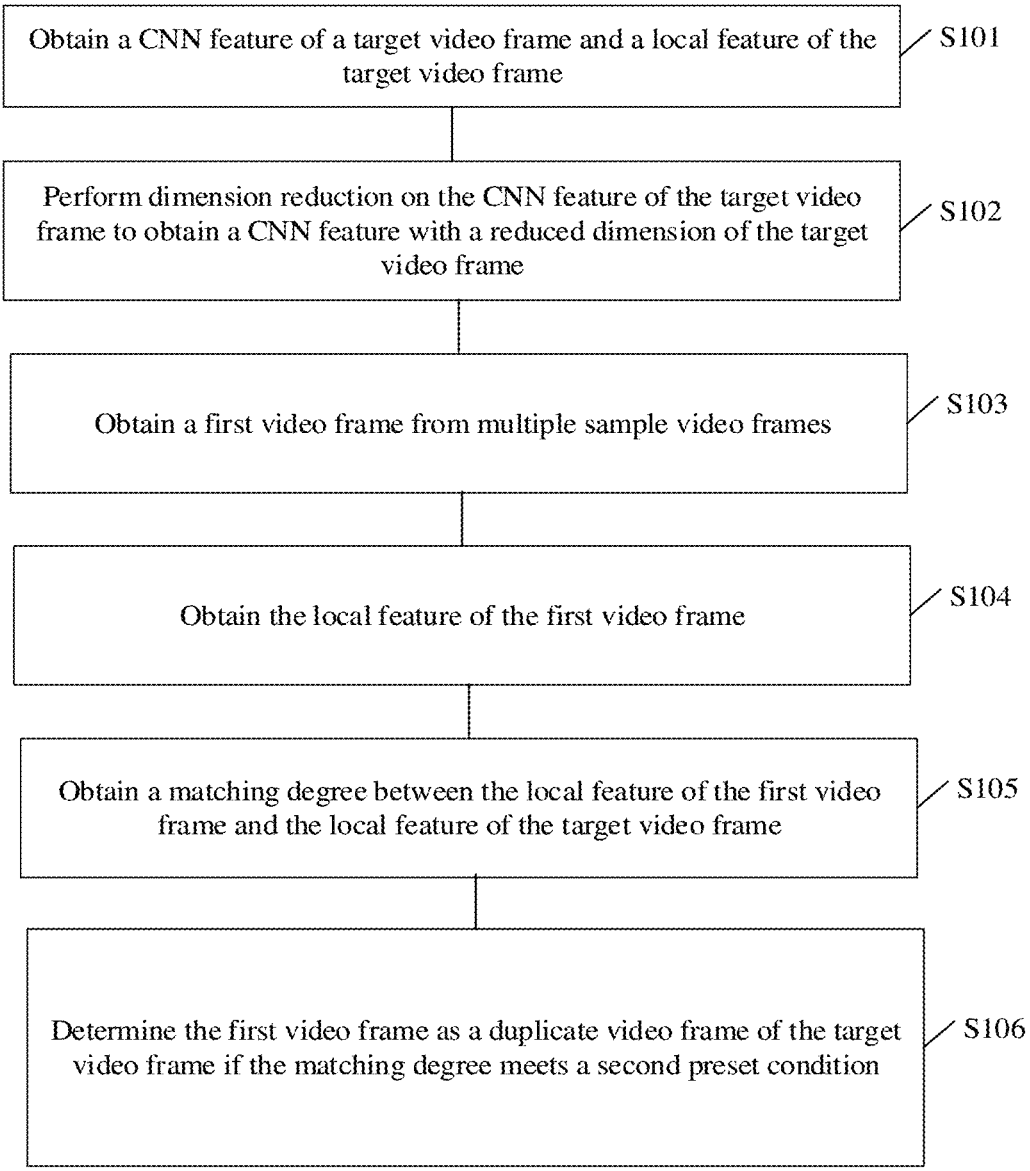
FIG. 1 is a flowchart illustrating a method for video frame processing according to implementations of the disclosure.

Referring to FIG. 1, which is a flowchart illustrating a method for video frame processing according to implementations of the disclosure. In implementations of the disclosure, a first level filtering is performed according to a distance between a convolutional neural network (CNN) feature with a reduced dimension of a target video frame and a CNN feature with a reduced dimension of a sample video frame, and a second level filtering is performed according to a local feature of the target video frame and a local feature of the first video frame, as such, the duplicate video frame of the target video frame can be accurately detected with high accuracy.

As illustrated in FIG. 1, the method for video frame processing according to implementations of the disclosure may include the following S101-S106.

S101, a CNN feature(s) of a target video frame and a local feature(s) of the target video frame are obtained. The local feature of the target video frame includes a first key point of the target video frame and a feature descriptor corresponding to the first key point.

S102, dimension reduction is performed on the CNN feature of the target video frame to obtain a CNN feature with a reduced dimension of the target video frame.

In one implementation, the target video frame can be any video frame in a video to-be-queried. Alternatively, the target video frame can be a separate picture frame to be compared. If the target video frame is a video frame in a video to-be-queried, it is obtained by taking equal interval video screenshots of the video to-be-queried to obtain multiple video frames, and the target video frame is any one of the multiple video frames. Generally, the screenshot interval for the video to-be-queried should be less than a screenshot interval for a sample video in a database to be compared, that is, a higher screenshot frequency is applied to the video to-be-queried, such as 5 frames per second, so as to match a sample video frame in the database. Preferably, the time point for screenshots can shake randomly, to avoid an extreme situation that all video frames to-be-queried happen to have a large interval from the sample video frame in the database.

The CNN feature of the target video frame and the local feature of the target video frame are obtained. The local feature of the target video frame is a feature descriptor of a key point extracted from the target video frame. The key point extracted from the target video frame is a pixel in the target video frame whose pixel value is significantly different from that of adjacent pixels, such as edges and corners of an image in the target video frame.

Optionally, the CNN feature of the target video frame can be obtained as follows. A CNN trained on a large scale universal picture data set (imagenet, open-images, or ml-images data set) is selected, the target video frame is inputted into the CNN, and pooling is performed on a feature map outputted at the last one or more convolutional layers to obtain an original CNN feature of the target video frame. The CNN feature is a floating-point vector with fixed length and high dimension (e.g. 2048 dimension). After the CNN feature of the target video frame is obtained, dimension reduction is performed on the CNN feature with a principal component analysis (PCA) matrix to obtain a CNN feature with a reduced dimension of the target video frame.

Optionally, the local feature of the target video frame can be obtained as follows. The local feature can be extracted with any local feature extractor such as scale invariant feature transform (SIFT), speeded up robust features (SURF), oriented FAST and rotated BRIEF (ORB), accelerated KAZE (AKAZE), and binary robust independent elementary feature (BRISK). According to test, BRISK has relatively high accuracy and speed. Usually, the local features extracted with default parameters will contain a large number of key points and corresponding feature descriptors. In order to save storage space, the key points can be sorted by response, and only dozens of key points with the highest response and corresponding feature descriptors are retained, where on key point corresponds to one feature descriptor.

Preferably, for some video frames with smooth texture, too few key points may be detected. The detection threshold can be reduced once or multiple times until enough key points are detected.

S103, a first video frame is obtained from multiple sample video frames. A distance between a CNN feature with a reduced dimension of the first video frame and the CNN feature with the reduced dimension of the target video frame meets a first preset condition.

In one implementation, K sample video frames closest to the CNN feature with the reduced dimension of the target video frame are selected from the sample video frames already stored in the database. The first video frame can be any one of the K sample video frames. The sample video frames stored in the database are sample video frames of multiple sample videos. Optionally, take equal interval video screenshots of each sample video to obtain multiple sample video frames, the screenshot interval depends on the desired time resolution. For example, if a segment repetition of 5 s or more needs to be retrieved, the screenshot interval should be less than 5 s.

K sample video frames are selected from the multiple sample video frames, where the CNN features with the reduced dimension of the K sample video frames are those having the shortest distance to the CNN feature with the reduced dimension of the target video frame, that is, K distances between the CNN features with the reduced dimension of the K sample video frames and the CNN feature with the reduced dimension of the target video frame are the first K distances among distances between the CNN features of the reduced dimension of all sample video frames and the CNN feature with the reduced dimension of the target video frame, where the distances between the CNN features of the reduced dimension of all sample video frames and the CNN feature with the reduced dimension of the target video frame are sorted from small to large.

The K sample video frames with the shortest distance can be selected as follows. First, a CNN feature index of a sample video is obtained, the sample video includes all sample videos in the database, that is, one CNN feature index can be generated according to the CNN features with the reduced dimension of sample video frames of all sample videos in the database. The CNN feature index is a structure, which represents multiple clusters formed by clustering of CNN features with the reduced dimension of the sample video frames of all sample videos in the database. Each cluster includes one cluster center and a CNN feature with a reduced dimension of at least one sample video frame in the cluster. Thereafter, a distance between the CNN feature with the reduced dimension of the target video frame and the cluster center of each of multiple cluster frames, and a cluster with a cluster center having the shortest distance is determined as a target cluster. Optionally, the target cluster may include one or more clusters. If the target cluster includes multiple clusters, the distance between the cluster center of each of the multiple clusters and the CNN feature with the reduced dimension of the target video frame is ranked first. Finally, a distance between the CNN feature with the reduced dimension of the target video frame and the CNN feature with the reduced dimension of each of at least one sample video frame included in the target cluster is calculated, and any video frame among K sample video frames having the shortest distance is determined as the first video frame, that is, there are K first video frames.

Optionally, since the CNN feature with the reduced dimension in the CNN feature index has subjected to dimension reduction and quantization compression, the distance calculated is generally approximate. Therefore, an original CNN feature of at least one sample video frame included in a target cluster stored in a database can be read dynamically for calculating and sorting, to obtain K sample video frames having the shortest distance as the K first video frames.

Further optionally, the K first video frames can be filtered. For example, if the distance of some first video frames exceeds a threshold, such first video frame will be eliminated directly.

Figure 2:
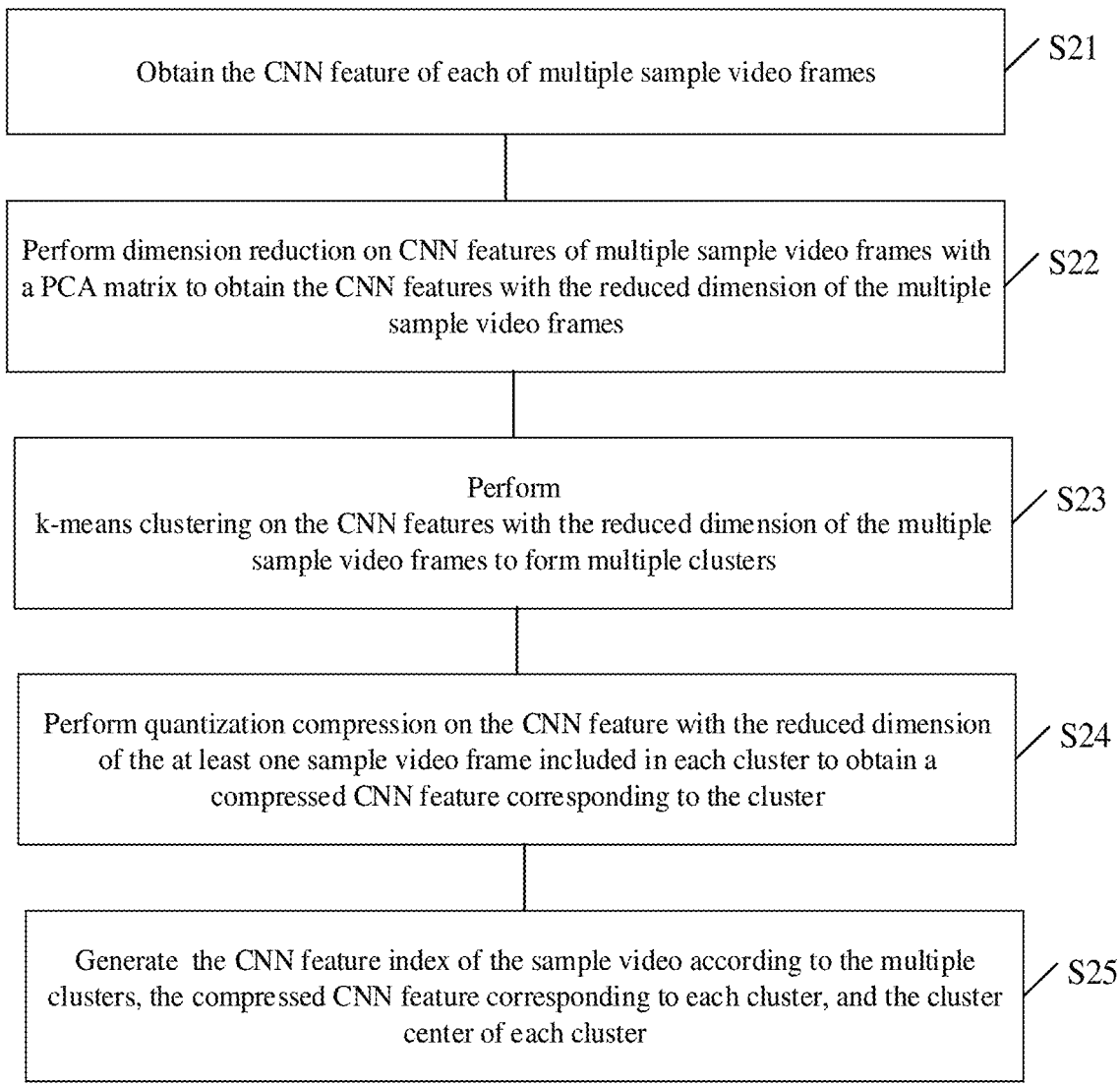
FIG. 2 is a schematic flowchart illustrating generation of a CNN feature index according to implementations of the disclosure.

The CNN feature index generation mentioned above can refer to FIG. 2. As illustrated in FIG. 2, the CNN feature index generation includes steps S21-S25.

S21, the CNN feature of each of multiple sample video frames is obtained.

In one implementation, the CNN feature index is generated according to sample video frames included in all sample videos in a database. Take equal interval video screenshots of the videos in the database to generate corresponding sample video frames. The screenshot interval depends on the desired time resolution. For example, if a segment repetition of 5 s or more needs to be retrieved, the screenshot interval should be less than 5 s.

The CNN feature of each of the multiple sample video frames generated is obtained. A CNN trained on a large scale universal picture data set (imagenet, open-images, or ml-images data set) is selected. The sample video frames extracted are respectively inputted into the CNN, and pooling is performed on a feature map outputted at the last one or more convolutional layers to obtain the CNN feature of the video frame. The CNN feature is a floating-point vector with fixed length and high dimension (e.g. 2048 dimension).

Further optionally, the local feature of the sample video frame of all sample videos in the database can be extracted. The local feature can be extracted with any local feature extractor such as SIFT, SURF, ORB, AKAZE, and BRISK. According to test, BRISK has relatively high accuracy and speed. Usually, the local features extracted with default parameters will contain a large number of key points and corresponding feature descriptors. In order to save storage space, the key points can be sorted by response, and only dozens of key points with the highest response and corresponding feature descriptors are retained. Preferably, for some video frames with smooth texture, too few key points may be detected. The detection threshold can be reduced once or multiple times until enough key points are detected.

Once the CNN feature and the local feature of the sample video frame of all sample videos are extracted, a database can be established according to a video identifier (ID) of a sample video and an ID of a video frame, and an information tuple (video ID, video frame ID, time point of a video frame, CNN feature, local feature) is loaded to the database. Assuming that the total length of the video is 100000 hours and screenshots are taken every 5 seconds, the CNN feature is 2048 dimensional single precision floating-point numbers (occupying 8 KB space), the local feature is 128 BRISK feature descriptors (occupying about 128×64 Byte=8 KB space), the size of the database is about 1.07 TB and can be deployed on a single machine.

Figure 3:
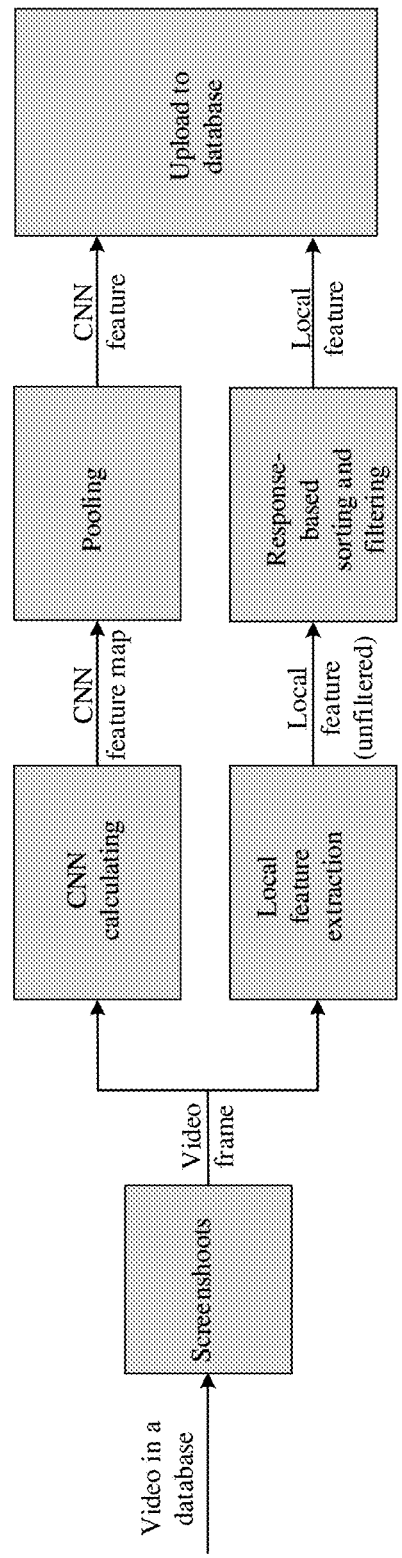
FIG. 3 is a flowchart illustrating dual-feature extraction of a video frame according to implementations of the disclosure.

FIG. 3 is a schematic diagram illustrating CNN feature extraction and local feature extraction according to implementations of the disclosure. As illustrated in FIG. 3, screenshots of a video in the database are taken to obtain sample video frames. A CNN feature map can be obtained through calculation by a CNN, and pooling is performed on the CNN feature map to obtain a CNN feature of the sample video frame. Meanwhile, local feature extraction is performed on the sample video frame to obtain the local feature of the sample video frame. Thereafter, the local feature is filtered through response-based sorting and filtering to obtain filtered local feature of the sample video frame. The CNN feature and local feature of the sample video frame is loaded to the database to be stored.

S22, dimension reduction is performed on CNN features of multiple sample video frames with a PCA matrix to obtain the CNN features with the reduced dimension of the multiple sample video frames.

In one implementation, the original CNN features of part or all of the sample video frames are read out from the database and then loaded to a memory, the PCA matrix is trained with the original CNN features loaded to the memory. The PCA matrix can reduce the dimension of the CNN feature while retain the original information as much as possible. Optionally, by squaring the eigenvalue of the PCA matrix and taking the reciprocal, the PCA matrix can have the effect of data whitening.

After the PCA matrix is obtained through training, the original CNN features of all sample video frames in the database are loaded to the memory at one time or in batches, and dimension reduction is performed on the original CNN features of all sample video frames with the PCA matrix trained, to obtain the CNN features with the reduced dimension of all the sample video frames.

S23, k-means clustering is performed on the CNN features with the reduced dimension of the multiple sample video frames to form multiple clusters, where each cluster includes the CNN feature with the reduced dimension of at least one sample video frame.

In one implementation, k-means clustering is performed on the CNN features with the reduced dimension of all sample video frames according to Euclidean distance or cosine distance, to obtain N clusters and a cluster center of each cluster. Each cluster includes the CNN feature with the reduced dimension of at least one sample video frame.

S24, quantization compression is performed on the CNN feature with the reduced dimension of the at least one sample video frame included in each cluster to obtain a compressed CNN feature corresponding to the cluster.

In one implementation, quantization compression is performed on the CNN feature with the reduced dimension of the sample video frame included in each cluster. Optionally, the CNN feature with the reduced dimension of the sample video frame included in each cluster is further compressed with scalar quantization or product quantization. If scalar quantization is adopted, each dimension of the CNN feature with the reduced dimension of the sample video frame can be reduced from a 4-byte floating-point number to a 1-byte integer.

S25, the CNN feature index of the sample video is generated according to the multiple clusters, the compressed CNN feature corresponding to each cluster, and the cluster center of each cluster.

In one implementation, according to N clusters formed through k-means clustering, the cluster center of each of the N clusters, and the compressed CNN feature corresponding to each cluster, the CNN feature index of the sample video in the database can be generated. The CNN feature index is a structure. The N clusters, the cluster center of each of the N clusters, and the compressed CNN feature corresponding to each cluster can be obtained according to the CNN feature index.

Assuming that the total length of a sample video is 100000 hours and take screenshots of one frame every 5 seconds, the dimension of the PCA is reduced to 256 and scalar quantization is used. The final size of the CNN feature index is 100,000×60×12×256 Byte=17 GB, which can be generated on a memory of a single machine.

S104, the local feature of the first video frame is obtained. The local feature of the first video frame includes a second key point in the first video frame and a feature descriptor corresponding to the second key point.

In one implementation, after the first video frame is obtained from all sample video frames, further verification by the local feature is required. The manner in which the local feature of the first video frame is obtained can be that the local feature of the first video frame is extracted from the database setup at S21. Optionally, the local feature can be searched from the database according to the ID of a video to which the first video frame belongs and the ID of the first video frame. The local feature of the first video frame includes the second key point extracted from the first video frame and the feature descriptor corresponding to the second key point. The key point extracted from the first video frame can be a pixel in the first video frame whose pixel value is significantly different from that of adjacent pixels, such as edges and corners of the first video frame.

Optionally, if there are K first video frames, the local feature of each of the K first video frames needs to be obtained.

S105, a matching degree between the local feature of the first video frame and the local feature of the target video frame is calculated.

S106, if the matching degree meets a second preset condition, the first video frame is determined as a duplicate video frame of the target video frame.

In one implementation, if there are K first video frames, for each of the K video frames, the matching degree between the local feature of the first video frame and the local feature of the target video frame is calculated. If the matching degree of the local feature of a first video frame and the local feature of the target video frame is greater than a first threshold, the first video frame and the target video frame are determined as duplicate video frames.

The manner in which the matching degree between the local feature of the first video frame and the local feature of the target video frame is calculated can be as follows. For example, the local feature of the target video frame includes m first feature descriptors corresponding to m first key points and one first key point corresponds to one first feature descriptor, and the first feature descriptor is represented as $A_i$ (i=1, 2, . . . m). The local feature of the first video frame includes n second feature descriptors corresponding to n second key points, and one second key point corresponds to one second feature descriptor. For example, the second feature descriptor can be represented as $B_j$ (j=1, 2, . . . n), m is a natural number greater than or equal to 2, and n is a natural number greater than or equal to 2.

For each first feature descriptor AJ, obtain a distance between each of n second feature descriptors $B_j$ and the first feature descriptor to obtain n distances. Sort the n distances in order from large to small to form a sorting queue, determine the last k distances in the sorting queue frame, that is, the smallest k distances, and determine that the first feature descriptor is an effective descriptor that matches the first video frame according to the k distances. For example, k=2. For each Ai, $B_{j1}$ with the smallest distance ($D_{i,j,1}$) and $B_{j2}$ with the second smallest distance ($D_{i,j,2}$) are determined, if $D_{i,j,1} < r*D_{i,j,2}$ (r is ranged from 0.6 to 0.9), the first feature descriptor $A_i$ can be considered as the effective descriptor that matches the first video frame.

The matching degree between the local feature of the first video frame and the local feature of the target video frame is determined according to the number of effective descriptors in the m first feature descriptors in the target video frame. For example, the final matching degree can be expressed as: matching degree=the number of effective descriptors/max (m, n).

If there are K first video frames, that is, the target video frame to-be-queried and multiple sample video frames may be duplicate video frames, the matching degree between the target video frame and each of the K first video frames will need to be verified, so as to determine whether the target video frame and the first video frame are duplicated video frames.

Once determining that the target video frame and the first video frame are duplicate video frames, the playing time point where the duplicate video frame is located and the video of the sample video where the duplicate video frame comes from can be further determined. For example, the target video frame is a video frame at a first playing time point of the video to-be-queried, the frame ID of the first video frame can be obtained, and a second playing time point in a target video corresponding to the frame ID of the first video frame is searched for in the database. It should be noted that, if there are K first video frames, the K first video frames may correspond to different playing time points of different videos.

Further optionally, if the number of all duplicate video frames of the video to-be-queried and the target video is greater than a second threshold, and duplicate video frames satisfying a continuous distribution condition in all the duplicate video frames are distributed in a first time period of the video to-be-queried and a second time period of the target video, a video in the first time period of the video to-be-queried and a video in the second time period of the target video are determined as duplicate video segments, the first time period includes the first playing time point and the second time period includes the second playing time point.

The continuous distribution condition includes that a time difference between adjacent duplicate video frames is less than a third threshold.

In one implementation, the target video frame is any video frame in a video to-be-queried. Each video frame of the video to-be-queried is compared with the sample video frame of the sample video in the database to determine whether it is a duplicate video frame. The number of all duplicate video frames of the video to-be-queried and the target video is greater than a second threshold, such number can be determined by the number of frames determined as duplicate video frames in the video to-be-queried. For example, 100 video frames in the video to-be-queried and the sample video frame in the database are duplicate video frames, then the number of duplicate video frames is 100 and duplicate video frames satisfying a continuous distribution condition in all the duplicate video frames are distributed in a first time period of the video to-be-queried and a second time period of the target video, a video in the first time period of the video to-be-queried and a video in the second time period of the target video are determined as duplicate video segments. The continuous distribution condition includes that a time difference between adjacent duplicate video frames is less than a third threshold, that is, the duplicate video frames are basically continuously distributed in the first time period of the video to-be-queried and the second time period of the target video.

When the number of sample videos further increases, such as more than one million hours, it will be difficult to determine the duplicate video frames on a single machine due to the requirements of memory size and query speed, so the single machine can be expanded to a multi-machine distributed deployment. It is assumed that there are P computers available for deployment, and one specific method is as follows: the sample video frames of a sample video in a database are evenly distributed to P computers, and a CNN feature and a local feature of the sample video frame allocated to each computer are extracted in parallel, and each computer load the CNN feature and the local feature extracted to the database. The database shall adopt a scheme that can support massive data, such as cloud storage.

Part of CNN features are read into a memory of a computer from the database, a PCA matrix, a k-means clustering parameter, and a quantization compression parameter are obtained by training according to the CNN feature read out. The obtained PCA matrix, the K-means clustering parameter and the quantization compression parameter are shared on all computers.

A total number of P CNN features are read on each of P computers, without omitting or overlapping. Clustering is performed according to the shared parameters and the CNN feature read respectively, and a CNN feature index is established on the memory of each computer, where each computer has a different CNN feature index. When querying duplicate videos, the CNN feature and the local feature of the video to-be-queried are calculated on one or more computers, the CNN feature and the local feature thus obtained are sent to all computers. Each computer calculates in parallel a distance between the CNN feature of the video to-be-queried and the CNN feature in each cluster indicated by the CNN feature index of each computer, sends the distance calculated to one computer, and this computer will perform sorting according to the distances. K results with the shortest distance are determined, and K first video frames are determined. Further, whether the first video frame is a duplicate video frame is determined by the matching of the local feature.

In implementations of the disclosure, by performing first level filtering according to the distance between the CNN feature with the decreased dimension of the target video frame and the CNN feature with the decreased dimension of the sample video frame, and performing second level filtering according to the matching degree between the local feature of the target video frame and the local feature of the first video frame, the duplicate video frame of the target video frame can be detected accurately with high accuracy.

Figure 4:
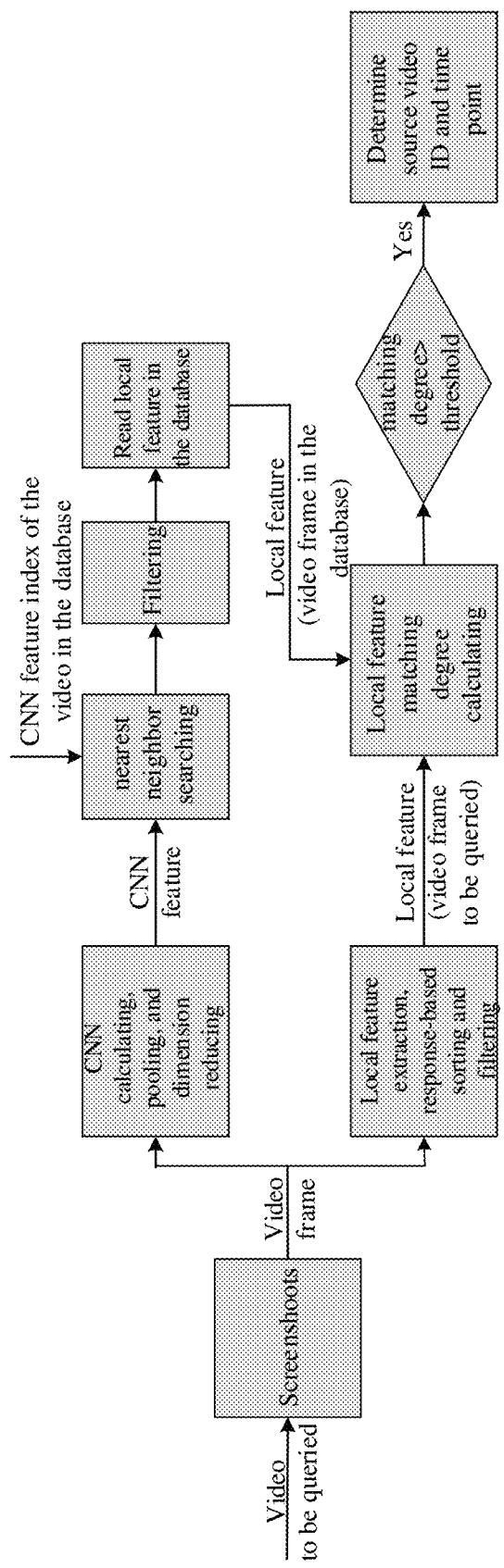
FIG. 4 is a schematic diagram illustrating duplicate video retrieval according to implementations of the disclosure.

Referring to FIG. 4, which is a flowchart illustrating duplicate video frame detection according to implementations of the disclosure. As illustrated in FIG. 4, screenshots of the video to-be-queried are taken to obtain video frames, and CNN features of the video frames can be obtained through CNN calculating, pooling, and dimension reducing. According to the CNN feature index of the video in the database, nearest neighbor searching and filtering are performed to determine a sample video frame which is nearest to the CNN feature of the video frame as the first video frame. In order to determine whether the first video frame is a duplicate video frame, further verification through the local feature is required. That is, the local feature of the first video frame is read from the database.

Meanwhile, the local feature of the video frame is extracted. Sorting and filtering are performed according to response to obtain the local feature of the video frame. A matching degree between the local feature of the video frame and the local feature of the first video frame is determined, and if the matching degree is greater than a threshold, a source video ID of and a time point of the first video frame are determined.

Figure 5:
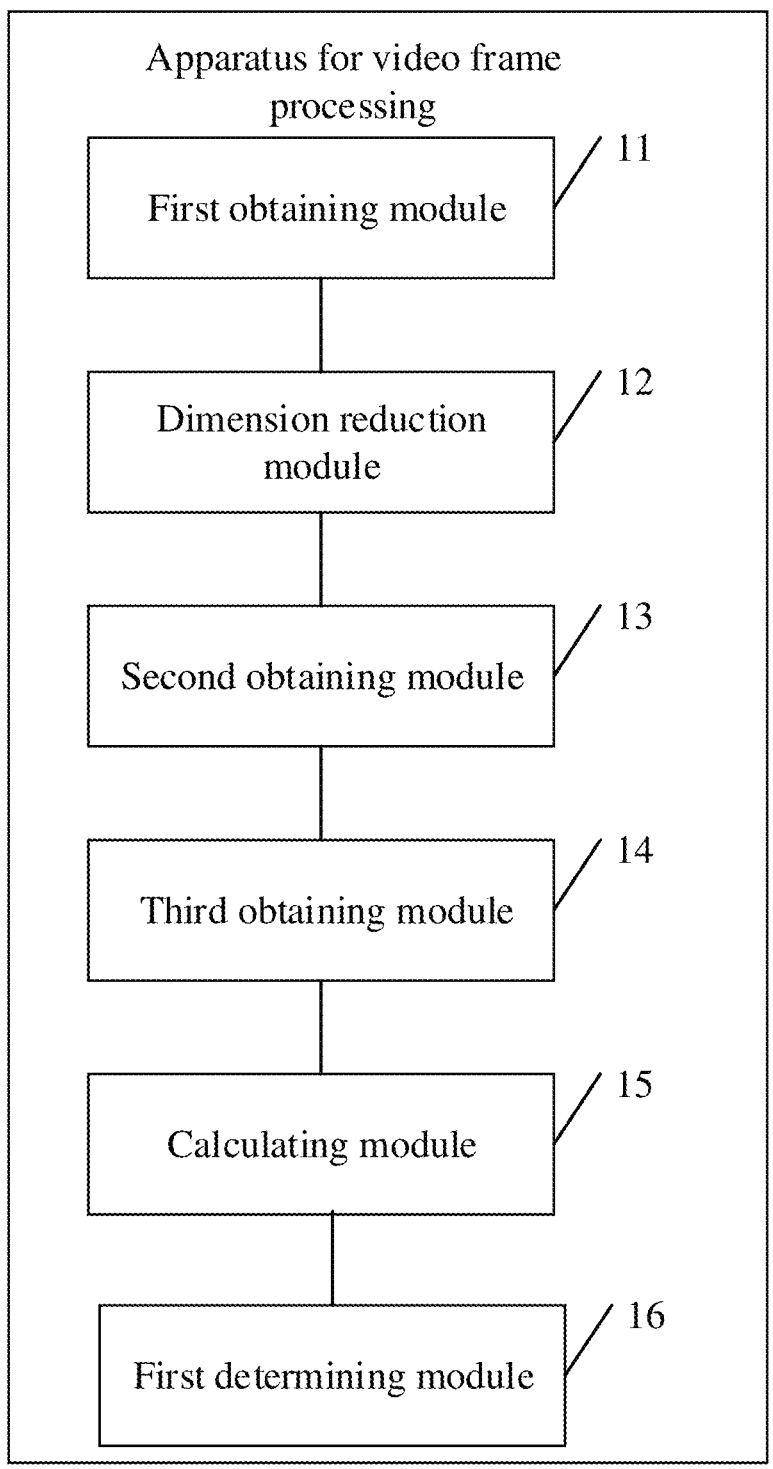
FIG. 5 is a schematic structural diagram illustrating an apparatus for video frame processing according to implementations of the disclosure.

Referring to FIG. 5, which is a schematic structural diagram illustrating an apparatus for video frame processing according to implementations of the disclosure. As illustrated in FIG. 5, the apparatus for video frame processing according to implementations of the disclosure may include a first obtaining module 11, a dimension reduction module 12, a second obtaining module 13, a third obtaining module 14, a calculating module 15, a first determining module 16.

The first obtaining module 11 is configured to obtain a convolutional neural network (CNN) feature of a target video frame and a local feature of the target video frame, the local feature of the target video frame comprising a first key point of the target video frame and a feature descriptor corresponding to the first key point.

The dimension reduction module 12 is configured to perform dimension reduction on the CNN feature of the target video frame to obtain a CNN feature with a reduced dimension of the target video frame.

In one implementation, the target video frame can be any video frame in a video to-be-queried. Alternatively, the target video frame can be a separate picture frame to be compared. If the target video frame is a video frame in a video to-be-queried, it is obtained by taking equal interval video screenshots of the video to-be-queried to obtain multiple video frames, and the target video frame is any one of the multiple video frames. Generally, the screenshot interval for the video to-be-queried should be less than a screenshot interval for a sample video in a database to be compared, that is, a higher screenshot frequency is applied to the video to-be-queried, such as 5 frames per second, so as to match a sample video frame in the database. Preferably, the time point for screenshots can shake randomly, to avoid an extreme situation that all video frames to-be-queried happen to have a large interval from the sample video frame in the database.

The CNN feature of the target video frame and the local feature of the target video frame are obtained. The local feature of the target video frame is a feature descriptor of a key point extracted from the target video frame. The key point extracted from the target video frame is a pixel in the target video frame whose pixel value is significantly different from that of adjacent pixels, such as edges and corners of an image in the target video frame.

Optionally, the CNN feature of the target video frame can be obtained as follows. A CNN trained on a large scale universal picture data set (imagenet, open-images, or ml-images data set) is selected, the target video frame is inputted into the CNN, and pooling is performed on a feature map outputted at the last one or more convolutional layers to obtain an original CNN feature of the target video frame. The CNN feature is a floating-point vector with fixed length and high dimension (e.g. 2048 dimension). After the CNN feature of the target video frame is obtained, dimension reduction is performed on the CNN feature with a principal component analysis (PCA) matrix to obtain a CNN feature with a reduced dimension of the target video frame.

Optionally, the local feature of the target video frame can be obtained as follows. The local feature can be extracted with any local feature extractor such as scale invariant feature transform (SIFT), speeded up robust features (SURF), oriented FAST and rotated BRIEF (ORB), accelerated KAZE (AKAZE), and binary robust independent elementary feature (BRISK). According to test, BRISK has relatively high accuracy and speed. Usually, the local features extracted with default parameters will contain a large number of key points and corresponding feature descriptors. In order to save storage space, the key points can be sorted by response, and only dozens of key points with the highest response and corresponding feature descriptors are retained, where on key point corresponds to one feature descriptor.

Preferably, for some video frames with smooth texture, too few key points may be detected. The detection threshold can be reduced once or multiple times until enough key points are detected.

The second obtaining module 13 is configured to obtain a first video frame from multiple sample video frames. A distance between a CNN feature with a reduced dimension of the first video frame and the CNN feature with the reduced dimension of the target video frame meets a first preset condition.

Optionally, the second obtaining module may include a first obtaining unit, a first calculating unit, and a second calculating unit.

The first obtaining unit is configured to obtain a CNN feature index of a sample video, the sample video comprising the plurality of sample video frames, the CNN feature index being indicative of multiple clusters formed by clustering of a CNN feature with a reduced dimension of the plurality of sample video frames, each cluster comprising a cluster center and a CNN feature with a reduced dimension of at least one sample video frame in the cluster.

The first calculating unit is configured to calculate a distance between the CNN feature with the reduced dimension of the target video frame and the cluster center of each of the plurality of clusters and determining a cluster with a cluster center at the shortest distance as a target cluster.

The second calculating unit is configured to calculate a distance between the CNN feature with a reduced dimension of the target video frame and a CNN feature with a reduced dimension of each of the at least one sample video frame included in the target cluster, and determining a sample video frame, which corresponds to a CNN feature with a reduced dimension at the shortest distance, as the first video frame.

In one implementation, K sample video frames closest to the CNN feature with the reduced dimension of the target video frame are selected from the sample video frames already stored in a database. The first video frame can be any one of the K sample video frames. The sample video frames stored in the database are sample video frames of multiple sample videos. Optionally, take equal interval video screenshots of each sample video to obtain multiple sample video frames, the screenshot interval depends on the desired time resolution. For example, if a segment repetition of 5 s or more needs to be retrieved, the screenshot interval should be less than 5 s.

K sample video frames are selected from the multiple sample video frames, where the CNN features with the reduced dimension of the K sample video frames are those having the shortest distance to the CNN feature with the reduced dimension of the target video frame, that is, K distances between the CNN features with the reduced dimension of the K sample video frames and the CNN feature with the reduced dimension of the target video frame are the first K distances among distances between the CNN features with the reduced dimension of all sample video frames and the CNN feature with the reduced dimension of the target video frame, where the distances between the CNN features of the reduced dimension of all sample video frames and the CNN feature with the reduced dimension of the target video frame are sorted from small to large.

The K sample video frames with the shortest distance can be selected as follows. First, a CNN feature index of a sample video is obtained, the sample video includes all sample videos in the database, that is, one CNN feature index can be generated according to the CNN features with the reduced dimension of sample video frames of all sample videos in the database. The CNN feature index is a structure, which represents multiple clusters formed by clustering of CNN features with a reduced dimension of the sample video frames of all sample videos in the database. Each cluster includes one cluster center and a CNN feature with a reduced dimension of at least one sample video frame in the cluster. Thereafter, a distance between the CNN feature with the reduced dimension of the target video frame and the cluster center of each of multiple cluster frames, and a cluster with a cluster center having the shortest distance is determined as a target cluster. Optionally, the target cluster may include one or more clusters. If the target cluster includes multiple clusters, the distance between the cluster center of each of the multiple clusters and the CNN feature with the reduced dimension of the target video frame is ranked first. Finally, a distance between the CNN feature with the reduced dimension of the target video frame and the CNN feature with the reduced dimension of each of at least one sample video frame included in the target cluster is calculated, and any video frame among K sample video frames having the shortest distance is determined as the first video frame, that is, there are K first video frames.

Optionally, since the CNN feature with the reduced dimension in the CNN feature index has subjected to dimension reduction and quantization compression, the distance calculated is generally approximate. Therefore, an original CNN feature of at least one sample video frame included in a target cluster stored in a database can be read dynamically for calculating and sorting, to obtain K sample video frames having the shortest distance as the K first video frames.

Further optionally, the K first video frames can be filtered. For example, if the distance of some first video frames exceeds a threshold, such first video frame will be eliminated directly.

The third obtaining module 14 is configured to obtain a local feature of the first video frame, the local feature of the first video frame comprising a second key point in the first video frame and a feature descriptor corresponding to the second key point.

In one implementation, after the first video frame is obtained from all sample video frames, further verification by the local feature is required. The manner in which the local feature of the first video frame is obtained can be that the local feature of the first video frame is extracted from the database setup at S21. Optionally, the local feature can be searched from the database according to the ID of a video to which the first video frame belongs and the ID of the first video frame. The local feature of the first video frame includes the second key point extracted from the first video frame and the feature descriptor corresponding to the second key point. The key point extracted from the first video frame can be a pixel in the first video frame whose pixel value is significantly different from that of adjacent pixels, such as edges and corners of the first video frame.

Optionally, if there are K first video frames, the local feature of each of the K first video frames needs to be obtained.

The calculating module 15 is configured to calculate a matching degree between the local feature of the first video frame and the local feature of the target video frame.

Optionally, the calculating module 15 may include a second obtaining unit, a sorting unit, a third obtaining unit, a first determining unit, and a second determining unit.

The second obtaining unit is configured to obtain, for each first feature descriptor, a distance between each of the n second feature descriptors and the first feature descriptor to obtain n distances.

The sorting unit is configured to sort the n distances to form a sorting queue in order from large to small.

The third obtaining unit is configured to obtain last k distances in the sorting queue, k being a natural number greater than or equal to 2.

The first determining unit is configured to determine, according to the k distances, that the first feature descriptor is an effective descriptor matching the first video frame.

The second determining unit is configured to determine the matching degree between the local feature of the first video frame and the local feature of the target video frame according to the number of effective descriptors in the m first feature descriptors.

The first determining module 16 is configured to determine the first video frame as a duplicate video frame of the target video frame if the matching degree meets a second preset condition.

Optionally, the first determining module includes a fourth obtaining unit and a third determining unit.

The fourth obtaining unit is configured to obtain a frame ID of the first video frame.

The third determining unit is configured to search for a second playing time point in the target video corresponding to the frame ID of the first video frame, and determine a video frame at the second playing time point in the target video as a duplicate video frame of a video frame at the first playing time point in the video to-be-queried.

In one implementation, if there are K first video frames, for each of the K video frames, the matching degree between the local feature of the first video frame and the local feature of the target video frame is calculated. If the matching degree of the local feature of a first video frame and the local feature of the target video frame is greater than a first threshold, the first video frame and the target video frame are determined as duplicate video frames.

The manner in which the matching degree between the local feature of the first video frame and the local feature of the target video frame is calculated can be as follows. For example, the local feature of the target video frame includes m first feature descriptors corresponding to m first key points and one first key point corresponds to one first feature descriptor, and the first feature descriptor is represented as $A_i$ (i=1, 2, . . . m). The local feature of the first video frame includes n second feature descriptors corresponding to n second key points, and one second key point corresponds to one second feature descriptor. For example, the second feature descriptor can be represented as $B_j$ (j=1, 2, . . . n), m is a natural number greater than or equal to 2, and n is a natural number greater than or equal to 2.

For each first feature descriptor $A_i$, obtain a distance between each of n second feature descriptors $B_j$ and the first feature descriptor to obtain n distances. Sort the n distances in order from large to small to form a sorting queue, determine the last k distances in the sorting queue frame, that is, the smallest k distances, and determine according to the k distances that the first feature descriptor is an effective descriptor that matches the first video frame. For example, k=2. For each Ai, $B_{j1}$ with the smallest distance ($D_{i,j,1}$) and $B_{j2}$ with the second smallest distance ($D_{i,j,2}$) are determined, if $D_{i,j,1}$<r*$D_{i,j,2}$ (r is ranged from 0.6 to 0.9), the first feature descriptor $A_i$ can be considered as the effective descriptor that matches the first video frame.

The matching degree between the local feature of the first video frame and the local feature of the target video frame is determined according to the number of effective descriptors in the m first feature descriptors in the target video frame. For example, the final matching degree can be expressed as: matching degree=the number of effective descriptors/max (m, n).

If there are K first video frames, that is, the target video frame to-be-queried and multiple sample video frames may be duplicate video frames, the matching degree between the target video frame and each of the K first video frames will need to be verified, so as to determine whether the target video frame and the first video frame are duplicated video frames.

Once determining that the target video frame and the first video frame are duplicate video frames, the playing time point where the duplicate video frame is located and the video of the sample video where the duplicate video frame comes from can be further determined. For example, the target video frame is a video frame at a first playing time point of the video to-be-queried, the frame ID of the first video frame can be obtained, and a second playing time point of a target video corresponding to the frame ID of the first video frame is searched for in the database. It should be noted that, if there are K first video frames, the K first video frames may correspond to different playing time points of different videos.

In implementations of the disclosure, the CNN feature and the local feature of the target video frame to-be-queried are obtained, and a sample video frame has a shortest distance to the CNN feature of the target video frame is selected from multiple sample video frames as the first video frame. Then the local feature of the first video frame is obtained, and at last, the matching degree between the local feature of the first video frame and the local feature of the target video frame is calculated. If the matching degree is greater than a first threshold, then it is determined that the first video frame and the target video frame are duplicate video frames. In this way, first level filtering is performed according to the CNN feature, and second level filtering is performed according to matching of the local feature. As such, whether the target video frame and the sample video frame are duplicate video frames can be determined accurately with high accuracy.

Refer to the description of the method implementation in FIG. 1 above for specific execution steps, which will not be repeated here.

Figure 6:
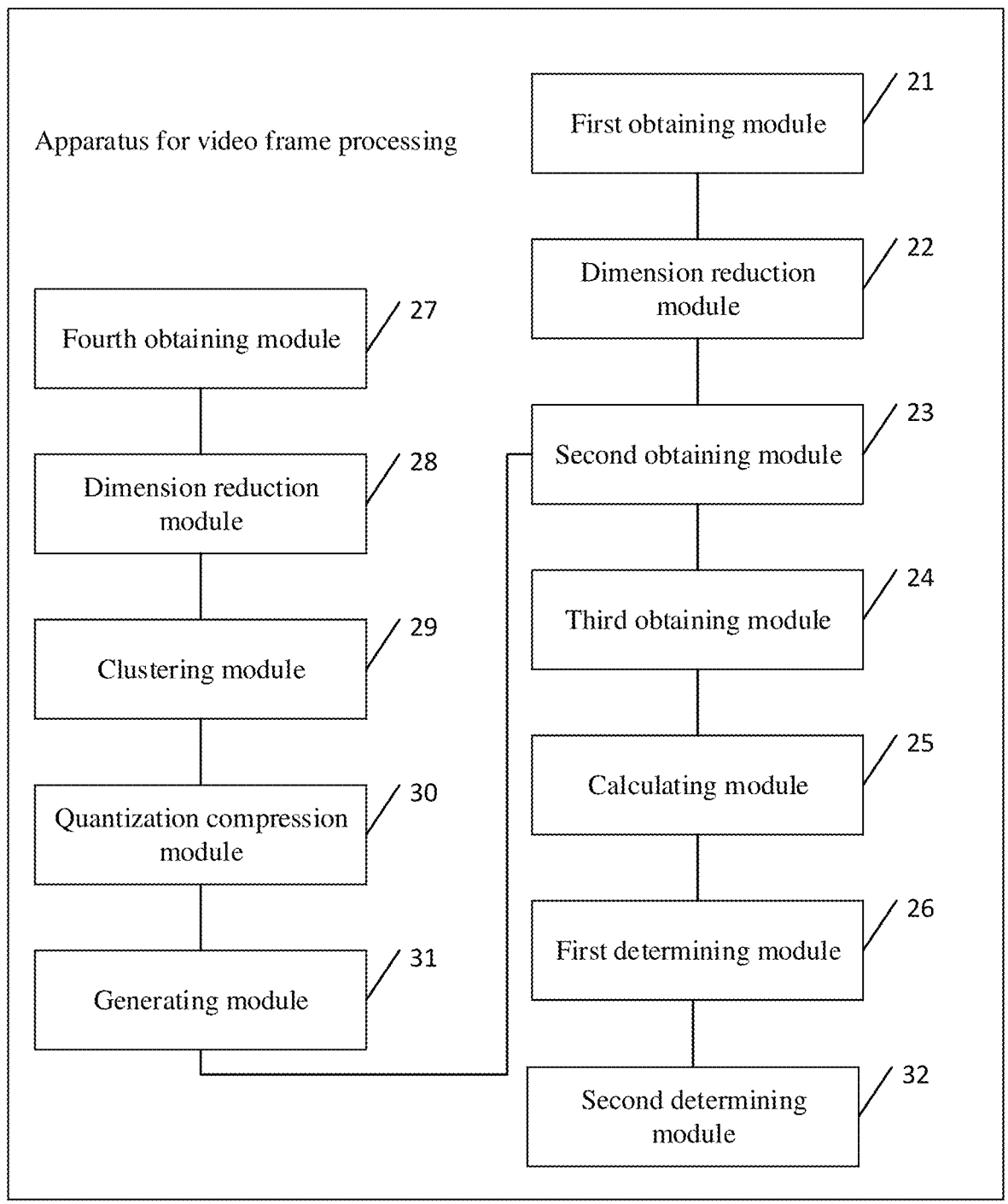
FIG. 6 is another schematic structural diagram illustrating an apparatus for video frame processing according to implementations of the disclosure.

FIG. 6 is another schematic structural diagram illustrating an apparatus for video frame processing according to implementations of the disclosure. As illustrated in FIG. 6, the apparatus for video frame processing according to implementations of the disclosure includes a first obtaining module 21, a dimension reduction module 22, a second obtaining module 23, a third obtaining module 24, a calculating module 25, a first determining module 26, a fourth obtaining module 27, a dimension reduction module 28, a clustering module 29, a quantization compression module 30, and a generating module 31, and a second determining module 32. For the first obtaining module 21, the dimension reduction module 22, the second obtaining module 23, the third obtaining module 24, the calculating module 25, and the first determining module 26, reference can be made to the description of FIG. 5, which will not be repeated herein again.

The fourth obtaining module 27 is configured to obtain the CNN features of multiple sample video frames.

In one implementation, a CNN feature index is generated according to the sample video frames included in all sample videos in the database. Take equal interval video screenshots of each video to generate corresponding sample video frames, the screenshot interval depends on the desired time resolution. For example, if a segment repetition of 5 s or more needs to be retrieved, the screenshot interval should be less than 5 s.

The CNN feature of each of the sample video frames obtained is extracted. Specifically, a CNN trained on a large scale universal picture data set (imagenet, open-images, or ml-images data set) is selected. Each of the sample video frames extracted in input into the CNN. Pooling is performed on the feature maps output from the last one or more convolution layers to obtain an original CNN feature of the video frame. The original CNN feature is a floating-point vector with fixed length and high dimension (e.g. 2048 dimension).

Further optionally, the local feature of the sample video frame of all sample videos in the database can be extracted. The local feature can be extracted with any local feature extractor such as scale invariant feature transform (SIFT), speeded up robust features (SURF), oriented FAST and rotated BRIEF (ORB), accelerated KAZE (AKAZE), and binary robust independent elementary feature (BRISK). According to test, BRISK has relatively high accuracy and speed. Usually, the local features extracted with default parameters will contain a large number of key points and corresponding feature descriptors. In order to save storage space, the key points can be sorted by response, and only dozens of key points with the highest response and corresponding feature descriptors are retained. More preferably, for some video frames with smooth texture, too few key points may be detected. The detection threshold can be reduced once or multiple times until enough key points are detected.

Once the CNN feature and the local feature of the sample video frame of all sample videos are extracted, a database can be established according to a video identifier (ID) of a sample video and an ID of a video frame, and an information tuple (video ID, video frame ID, time point of a video frame, CNN feature, local feature) is loaded to the database. Assuming that the total length of the video is 100000 hours and screenshots are taken every 5 seconds, the CNN feature is 2048 dimensional single precision floating-point numbers (occupying 8 KB space), the local feature is 128 BRISK feature descriptor (occupying about 128×64 Byte=8 KB space), the size of the database is about 1.07 TB and can be deployed on a single machine.

FIG. 3 is a flowchart illustrating CNN feature extraction and local feature extraction according to implementations of the disclosure. As illustrated on FIG. 3, take screenshots of a video in a database to obtain sample video frames. A CNN feature map is obtained by calculating through a CNN. Pooling is performed on the CNN feature map to obtain CNN features of sample video frames. At the same time, local feature extraction is performed on the sample video frames to obtain local features of the sample video frames. The local features are filtered through response-based sorting and filtering, to obtain filtered local features of the sample video frames. The CNN features and local features of the sample video frames are loaded to the database for storage.

The dimension reduction module 28 is configured to perform dimension reduction on the CNN feature of the multiple sample video frames with a principal component analysis (PCA) matrix to obtain the CNN feature with the reduced dimension of the multiple sample video frames.

In one implementation, the original CNN features of all or part of the sample video frames are read out from the database and loaded to the memory, and the PCA matrix is trained with the original CNN features loaded to the memory. The PCA matrix can reduce the dimension of the CNN features while retain the original information as much as possible. Optionally, by squaring the eigenvalue of the PCA matrix and taking the reciprocal, the PCA matrix can have the effect of data whitening.

After the PCA matrix is obtained through training, the original CNN features of all sample video frames in the database are loaded to the memory at one time or in batches, and dimension reduction is performed on the original CNN features of all sample video frames with the PCA matrix trained, to obtain the CNN features with the reduced dimension of all the sample video frames.

The clustering module 29 is configured to perform k-means clustering on the CNN feature with the reduced dimension of the multiple sample video frames to form multiple clusters. Each cluster includes a CNN feature with a reduced dimension of at least one sample video frame.

In one implementation, k-means clustering is performed on the CNN feature with the reduced dimension of all sample video frames according to Euclidean distance or cosine distance, to obtain N clusters and corresponding cluster centers. Each cluster includes the CNN feature with the reduced dimension of at least one sample video frame.

The quantization compression module 30 is configured to perform quantization compression on the CNN feature with the reduced dimension of the at least one sample video frame included in each cluster to obtain a compressed CNN feature corresponding to the cluster.

In one implementation, quantization compression is performed on the CNN feature with the reduced dimension included in each cluster. Optionally, the CNN feature with the reduced dimension included in each cluster can be further compressed through scalar quantization or product quantization. For example, if product quantization is used, each dimension of the CNN feature with the reduced dimension of the sample video frames can be compressed from a 4-byte floating-point number to a 1-byte integer.

The generating module 31 is configured to generate the CNN feature index of the sample video according to the multiple clusters, the compressed CNN feature corresponding to each cluster, and the cluster center of each cluster.

In one implementation, according to N clusters formed through k-means clustering, the cluster center of each of the N clusters, and the compressed CNN feature corresponding to each cluster, the CNN feature index of the sample video in the database can be generated. The CNN feature index is a structure. According to the CNN feature index, the N clusters, the cluster center of each of the N clusters, and the compressed CNN feature corresponding to each cluster.

Assuming that the total length of a sample video is 100000 hours and take screenshots of one frame every 5 seconds, the dimension of the PCA is reduced to 256 and scalar quantization is used. The final size of the CNN feature index is 100,000×60×12×256 Byte=17 GB, which can be generated on a memory of a single machine.

The second determining module 32 is configured to determine a video in a first time period of the video to-be-queried and a video in a second time period in the target video as duplicate video segments if the number of all duplicate video frames of the video to-be-queried and the target video is greater than a second threshold and duplicate video frames meets a continuous distribution condition among all the duplicate video frames are distributed in the first time period of the video to-be-queried and the second time period of the target video, the first time period includes the first playing time point, the second time period includes the second playing time point, and the continuous distribution condition includes that a time difference between adjacent duplicate video frames is less than the third threshold.

In one implementation, the target video frame is any video frame in a video to-be-queried. Each video frame of the video to-be-queried is compared with the sample video frame of the sample video in the database to determine whether it is a duplicate video frame. The number of all duplicate video frames of the video to-be-queried and the target video is greater than a second threshold, such number can be determined by the number of frames determined as duplicate video frames in the video to-be-queried. For example, 100 video frames in the video to-be-queried and the sample video frame in the database are duplicate video frames, then the number of duplicate video frames is 100 and duplicate video frames satisfying a continuous distribution condition in all the duplicate video frames are distributed in a first time period of the video to-be-queried and a second time period of the target video, a video in the first time period of the video to-be-queried and a video in the second time period of the target video are determined as duplicate video segments. The continuous distribution condition includes that a time difference between adjacent duplicate video frames is less than a third threshold, that is, the duplicate video frames are basically continuously distributed in the first time period of the video to-be-queried and the second time period of the target video.

In implementations of the disclosure, a first level filtering is performed according to a distance between the CNN feature with the reduced dimension of the target video frame and the CNN feature with the reduced dimension of the sample video frame, and a second level filtering is performed according to the local feature of the target video frame and the local feature of the first video frame, as such, the duplicate video frame of the target video frame can be accurately detected with high accuracy.

For operating steps, reference can be made to the description of the method implementation of FIG. 1, which will not be repeated herein.

Figure 7:
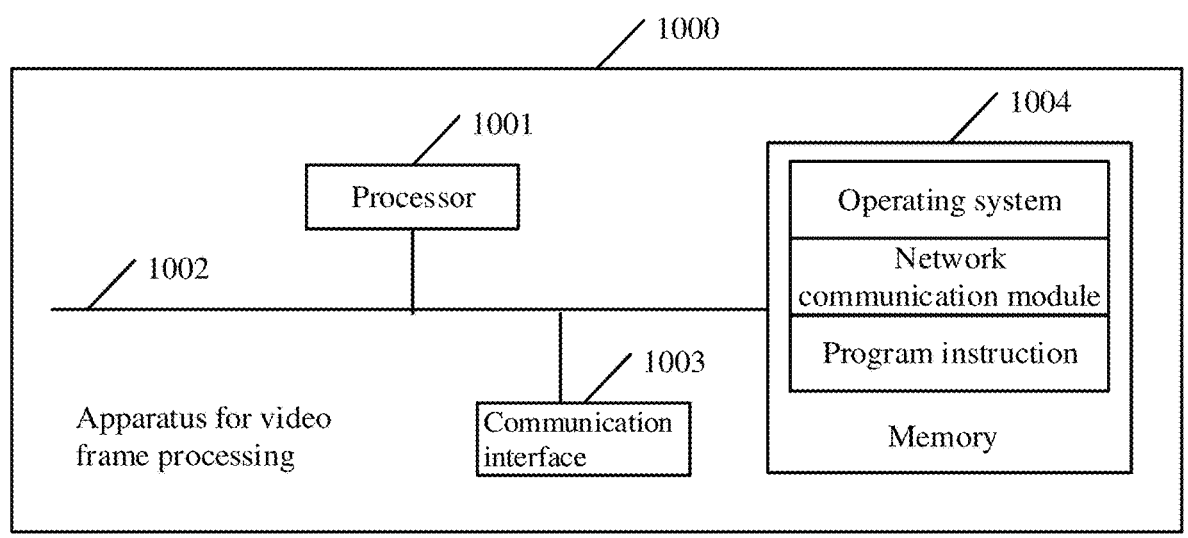
FIG. 7 is still another schematic structural diagram illustrating an apparatus for video frame processing according to implementations of the disclosure.

Referring to FIG. 7, which is another schematic structural diagram illustrating an apparatus for video frame processing provided in implementations of the disclosure. As illustrated in FIG. 7, the apparatus 1000 for video frame processing includes at least one processor such as a central processing unit (CPU), at least one communication interface 1003, a memory 1004, and at least one communication bus 1002. The communication bus 1002 is configured for connection and communication between these components. The communication interface 1003 may optionally include a standard wired interface and a wireless interface (such as a Wi-Fi interface). The memory 1004 may be a high-speed random access memory (RAM) or a non-transitory memory, such as at least one disk memory. Optionally, the memory 1004 may be at least one storage device far away from the processor 1001. As illustrated in FIG. 7, the memory 1004, as a kind of computer storage medium, may include an operating system, a network communication module, and program instructions.

In the apparatus for video frame processing illustrated in FIG. 7, the processor 1001 is configured to load the program instructions stored in the memory 1004 to perform the following operations: obtaining a convolutional neural network (CNN) feature of a target video frame and a local feature of the target video frame, the local feature of the target video frame comprising a first key point of the target video frame and a feature descriptor corresponding to the first key point; performing dimension reduction on the CNN feature of the target video frame to obtain a CNN feature with a reduced dimension of the target video frame; obtaining a first video frame from multiple sample video frames, a distance between a CNN feature with a reduced dimension of the first video frame and the CNN feature with the reduced dimension of the target video frame meets a first preset condition; obtaining a local feature of the first video frame, the local feature of the first video frame comprising a second key point in the first video frame and a feature descriptor corresponding to the second key point; calculating a matching degree between the local feature of the first video frame and the local feature of the target video frame; and determining the first video frame as a duplicate video frame of the target video frame if the matching degree meets a second preset condition.

Optionally, obtaining the CNN feature of the target video frame includes: obtaining a video to-be-queried; taking equal interval video screenshots of the video to-be-queried to obtain the target video frame, the target video frame being any of multiple video frames obtained by taking equal interval video screenshots of the video to-be-queried; and obtaining the CNN feature of the target video frame by inputting the target video frame into a CNN for processing.

Optionally, obtaining the first video frame from the plurality of sample video frames includes: obtaining a CNN feature index of a sample video, the sample video comprising the plurality of sample video frames, the CNN feature index being indicative of multiple clusters formed by clustering of a CNN feature with a reduced dimension of the plurality of sample video frames, each cluster comprising a cluster center and a CNN feature with a reduced dimension of at least one sample video frame in the cluster; calculating a distance between the CNN feature with the reduced dimension of the target video frame and the cluster center of each of the plurality of clusters and determining a cluster with a cluster center having the shortest distance as a target cluster; and calculating a distance between the CNN feature with the reduced dimension of the target video frame and a CNN feature with a reduced dimension of each of the at least one sample video frame included in the target cluster, and determining a sample video frame, which corresponds to a CNN feature with a reduced dimension at the shortest distance, as the first video frame.

Optionally, the local feature of the target video frame includes m first key points and m first feature descriptors corresponding to the m first key points, one first key point corresponds to one first feature descriptor, the local feature of the first video frame includes n second key points and n second feature descriptors corresponding to the n second key points, one second key point corresponds to one second feature descriptor, m being a natural number greater than or equal to 2, and n being a natural number greater than or equal to 2.

Calculating the matching degree between the local feature of the first video frame and the local feature of the target video frame includes: for each first feature descriptor, obtaining a distance between each of the n second feature descriptors and the first feature descriptor to obtain n distances; sorting the n distances to form a sorting queue in order from large to small; obtaining last k distances in the sorting queue, k being a natural number greater than or equal to 2; determining that the first feature descriptor is an effective descriptor matching the first video frame, according to the k distances; and determining the matching degree between the local feature of the first video frame and the local feature of the target video frame according to the number of effective descriptors in the m first feature descriptors.

Before obtaining the CNN feature of the target video frame and the local feature of the target video frame, the method further includes: obtaining a CNN feature of the plurality of sample video frames; performing dimension reduction on the CNN feature of the plurality of sample video frames with a principal component analysis (PCA) matrix to obtain the CNN feature with the reduced dimension of the plurality of sample video frames; performing k-means clustering on the CNN feature with the reduced dimension of the plurality of sample video frames to form multiple clusters, each cluster comprising a CNN feature with a reduced dimension of at least one sample video frame; performing quantization compression on the CNN feature with the reduced dimension of the at least one sample video frame included in each cluster to obtain a compressed CNN feature corresponding to the cluster; and generating the CNN feature index of the sample video according to the plurality of clusters, the compressed CNN feature corresponding to each cluster, and the cluster center of each cluster.

Optionally, the target video frame belongs to a video to-be-queried, a playing time point of the target video frame in the video to-be-queried is a first playing time point, and the first video frame belongs to a target video in a sample video. Determining the first video frame as the duplicate video frame of the target video frame includes: obtaining a frame identifier (ID) of the first video frame; searching for a second playing time point in the target video corresponding to the frame ID of the first video frame, and determining a video frame at the second playing time point in the target video as a duplicate video frame of a video frame at the first playing time point in the video to-be-queried.

Optionally, the processor 1001 can be further configured to load the program instructions stored in the memory 1004 to perform the following operations: if the number of all duplicate video frames of the video to-be-queried and the target video is greater than a second threshold and duplicate video frames meets a continuous distribution condition among all the duplicate video frames are distributed in a first time period of the video to-be-queried and a second time period of the target video, determining a video in the first time period of the video to-be-queried and a video in the second time period in the target video as duplicate video segments, where the first time period includes the first playing time point, the second time period includes the second playing time point, and the continuous distribution condition includes that a time difference between adjacent duplicate video frames is less than the third threshold.

It should be noted that, for specific execution processes, reference can be made to the specific description of the method implementation illustrated in FIG. 1, which will not be repeated herein.

Those skilled in the art can understand that all or part of the process of realizing the above method implementation can be completed by instructing relevant hardware through a computer program. The program can be stored in a computer readable storage medium. When the program is executed, it includes the process of the implementations of the above methods. The storage medium can be a magnetic disc, an optical disc, a read-only memory (ROM) or a RAM, and so on.

What is claimed is:

1. A method for video frame processing, comprising:
    obtaining a convolutional neural network (CNN) feature of a target video frame and a local feature of the target video frame, the local feature of the target video frame comprising a first key point of the target video frame and a feature descriptor corresponding to the first key point;
    performing dimension reduction on the CNN feature of the target video frame to obtain a CNN feature with a reduced dimension of the target video frame;
    obtaining a first video frame from a plurality of sample video frames, a distance between a CNN feature with a reduced dimension of the first video frame and the CNN feature with the reduced dimension of the target video frame meeting a first preset condition;
    obtaining a local feature of the first video frame, the local feature of the first video frame comprising a second key point in the first video frame and a feature descriptor corresponding to the second key point;
    calculating a matching degree between the local feature of the first video frame and the local feature of the target video frame; and
    determining the first video frame as a duplicate video frame of the target video frame if the matching degree meets a second preset condition.

2. The method of claim 1, wherein obtaining the CNN feature of the target video frame comprises:
    obtaining a video to-be-queried;
    taking equal interval video screenshots of the video to-be-queried to obtain the target video frame, the target video frame being any of a plurality of video frames obtained by taking equal interval video screenshots of the video to-be-queried; and
    obtaining the CNN feature of the target video frame by inputting the target video frame into a CNN for processing.

3. The method of claim 1, wherein obtaining the first video frame from the plurality of sample video frames comprises:
    obtaining a CNN feature index of a sample video, the sample video comprising the plurality of sample video frames, the CNN feature index being indicative of a plurality of clusters formed by clustering of a CNN feature with a reduced dimension of the plurality of sample video frames, each cluster comprising a cluster center and a CNN feature with a reduced dimension of at least one sample video frame in the cluster;
    calculating a distance between the CNN feature with the reduced dimension of the target video frame and the cluster center of each of the plurality of clusters and determining a cluster with a cluster center having the shortest distance as a target cluster; and
    calculating a distance between the CNN feature with the reduced dimension of the target video frame and a CNN feature with a reduced dimension of each of the at least one sample video frame comprised in the target cluster, and determining a sample video frame, which corresponds to a CNN feature with a reduced dimension at the shortest distance, as the first video frame.

4. The method of claim 3, wherein the local feature of the target video frame comprises m first key points and m first feature descriptors corresponding to the m first key points, one first key point corresponds to one first feature descriptor, the local feature of the first video frame comprises n second key points and n second feature descriptors corresponding to the n second key points, one second key point corresponds to one second feature descriptor, m being a natural number greater than or equal to 2, and n being a natural number greater than or equal to 2, and wherein
    calculating the matching degree between the local feature of the first video frame and the local feature of the target video frame comprises:
        for each first feature descriptor, obtaining a distance between each of the n second feature descriptors and the first feature descriptor to obtain n distances;
        sorting the n distances to form a sorting queue in order from large to small;
        obtaining last k distances in the sorting queue, k being a natural number greater than or equal to 2;
        determining that the first feature descriptor is an effective descriptor matching the first video frame, according to the k distances; and
        determining the matching degree between the local feature of the first video frame and the local feature of the target video frame according to the number of effective descriptors in the m first feature descriptors.

5. The method of claim 3, further comprising:
    before obtaining the CNN feature of the target video frame and the local feature of the target video frame,
        obtaining a CNN feature of the plurality of sample video frames;
        performing dimension reduction on the CNN feature of the plurality of sample video frames with a principal component analysis (PCA) matrix to obtain the CNN feature with the reduced dimension of the plurality of sample video frames;
        performing k-means clustering on the CNN feature with the reduced dimension of the plurality of sample video frames to form a plurality of clusters, each cluster comprising a CNN feature with a reduced dimension of at least one sample video frame;

performing quantization compression on the CNN feature with the reduced dimension of the at least one sample video frame comprised in each cluster to obtain a compressed CNN feature corresponding to the cluster; and generating the CNN feature index of the sample video according to the plurality of clusters, the compressed CNN feature corresponding to each cluster, and the cluster center of each cluster.

6. The method of claim 1, wherein the target video frame belongs to a video to-be-queried, a playing time point of the target video frame in the video to-be-queried is a first playing time point, and the first video frame belongs to a target video in a sample video, wherein determining the first video frame as the duplicate video frame of the target video frame comprises:

obtaining a frame identifier (ID) of the first video frame; and searching for a second playing time point in the target video corresponding to the frame ID of the first video frame, and determining a video frame at the second playing time point in the target video as a duplicate video frame of a video frame at the first playing time point in the video to-be-queried.

7. The method of claim 6, further comprising:

if the number of all duplicate video frames of the video to-be-queried and the target video is greater than a second threshold and duplicate video frames meeting a continuous distribution condition among all the duplicate video frames are distributed in a first time period of the video to-be-queried and a second time period of the target video, determining a video in the first time period of the video to-be-queried and a video in the second time period in the target video as duplicate video segments, wherein the first time period comprises the first playing time point, the second time period comprises the second playing time point, and the continuous distribution condition comprises that a time difference between adjacent duplicate video frames is less than the third threshold.

8. An apparatus for video frame processing, comprising:

a processor; and a memory storing program instructions which, when executed by the processor, are operable with the processor to:

obtain a convolutional neural network (CNN) feature of a target video frame and a local feature of the target video frame, the local feature of the target video frame comprising a first key point of the target video frame and a feature descriptor corresponding to the first key point;

perform dimension reduction on the CNN feature of the target video frame to obtain a CNN feature with a reduced dimension of the target video frame;

obtain a first video frame from a plurality of sample video frames, a distance between a CNN feature with a reduced dimension of the first video frame and the CNN feature with the reduced dimension of the target video frame meeting a first preset condition;

obtain a local feature of the first video frame, the local feature of the first video frame comprising a second key point in the first video frame and a feature descriptor corresponding to the second key point;

calculate a matching degree between the local feature of the first video frame and the local feature of the target video frame; and determine the first video frame as a duplicate video frame of the target video frame if the matching degree meets a second preset condition.

9. The apparatus of claim 8, wherein the processor configured to obtain the CNN feature of the target video frame and the local feature of the target video frame is configured to:

obtain a video to-be-queried;

take equal interval video screenshots of the video to-be-queried to obtain the target video frame, the target video frame being any of a plurality of video frames obtained by taking equal interval video screenshots of the video to-be-queried; and obtain the CNN feature of the target video frame by inputting the target video frame into a CNN for processing.

10. The apparatus of claim 8, wherein the processor configured to obtain the first video frame from the plurality of sample video frames is configured to:

obtain a CNN feature index of a sample video, the sample video comprising the plurality of sample video frames, the CNN feature index being indicative of a plurality of clusters formed by clustering of a CNN feature with a reduced dimension of the plurality of sample video frames, each cluster comprising a cluster center and a CNN feature with a reduced dimension of at least one sample video frame in the cluster;

calculate a distance between the CNN feature with the reduced dimension of the target video frame and the cluster center of each of the plurality of clusters and determining a cluster with a cluster center at the shortest distance as a target cluster; and calculate a distance between the CNN feature with the reduced dimension of the target video frame and a CNN feature with a reduced dimension of each of the at least one sample video frame comprised in the target cluster, and determining a sample video frame, which corresponds to a CNN feature with a reduced dimension at the shortest distance, as the first video frame.

11. The apparatus of claim 10, wherein the local feature of the target video frame comprises m first key points and m first feature descriptors corresponding to the m first key points, one first key point corresponds to one first feature descriptor, the local feature of the first video frame comprises n second key points and n second feature descriptors corresponding to the n second key points, one second key point corresponds to one second feature descriptor, m being a natural number greater than or equal to 2, and n being a natural number greater than or equal to 2, and wherein the processor configured to calculate the matching degree between the local feature of the first video frame and the local feature of the target video frame is configured to:

obtain, for each first feature descriptor, a distance between each of the n second feature descriptors and the first feature descriptor to obtain n distances;

sort the n distances to form a sorting queue in order from large to small;

obtain last k distances in the sorting queue, k being a natural number greater than or equal to 2;

determine, according to the k distances, that the first feature descriptor is an effective descriptor matching the first video frame; and determine the matching degree between the local feature of the first video frame and the local feature of the target video frame according to the number of effective descriptors in the m first feature descriptors.

12. The apparatus of claim 10, wherein the processor is further configured to:
   obtain a CNN feature of the plurality of sample video frames;
   perform dimension reduction on the CNN feature of the plurality of sample video frames with a principal component analysis (PCA) matrix to obtain the CNN feature with the reduced dimension of the plurality of sample video frames;
   perform k-means clustering on the CNN feature with the reduced dimension of the plurality of sample video frames to form a plurality of clusters, each cluster comprising a CNN feature with a reduced dimension of at least one sample video frame;
   perform quantization compression on the CNN feature with the reduced dimension of the at least one sample video frame comprised in each cluster to obtain a compressed CNN feature corresponding to the cluster; and
   generate the CNN feature index of the sample video according to the plurality of clusters, the compressed CNN feature corresponding to each cluster, and the cluster center of each cluster.

13. The apparatus of claim 8, wherein the target video frame belongs to a video to-be-queried, a playing time point of the target video frame in the video to-be-queried is a first playing time point, and the first video frame belongs to a target video in a sample video, wherein the processor configured to determine the first video frame as a duplicate video frame of the target video frame if the matching degree meets the second preset condition is configured to:
   obtain a frame identifier (ID) of the first video frame; and
   search for a second playing time point in the target video corresponding to the frame ID of the first video frame, and determine a video frame at the second playing time point in the target video as a duplicate video frame of a video frame at the first playing time point in the video to-be-queried.

14. The apparatus of claim 13, wherein the processor is further configured to:
   determine a video in a first time period of the video to-be-queried and a video in a second time period in the target video as duplicate video segments if the number of all duplicate video frames of the video to-be-queried and the target video is greater than a second threshold and duplicate video frames meeting a continuous distribution condition among all the duplicate video frames are distributed in the first time period of the video to-be-queried and the second time period of the target video, wherein the first time period comprises the first playing time point, the second time period comprises the second playing time point, and the continuous distribution condition comprises that a time difference between adjacent duplicate video frames is less than the third threshold.

15. A non-transitory computer readable storage medium storing program instructions which, when executed by a computer, are operable with the computer to:
   obtain a convolutional neural network (CNN) feature of a target video frame and a local feature of the target video frame, the local feature of the target video frame comprising a first key point of the target video frame and a feature descriptor corresponding to the first key point;
   perform dimension reduction on the CNN feature of the target video frame to obtain a CNN feature with a reduced dimension of the target video frame;
   obtain a first video frame from a plurality of sample video frames, a distance between a CNN feature with a reduced dimension of the first video frame and the CNN feature with the reduced dimension of the target video frame meeting a first preset condition;
   obtain a local feature of the first video frame, the local feature of the first video frame comprising a second key point in the first video frame and a feature descriptor corresponding to the second key point;
   calculate a matching degree between the local feature of the first video frame and the local feature of the target video frame; and
   determine the first video frame as a duplicate video frame of the target video frame if the matching degree meets a second preset condition.

16. The non-transitory computer readable storage medium of claim 15, wherein the program instructions operable with the computer to obtain the CNN feature of the target video frame are operable with the computer to:
   obtain a video to-be-queried;
   take equal interval video screenshots of the video to-be-queried to obtain the target video frame, the target video frame being any of a plurality of video frames obtained by taking equal interval video screenshots of the video to-be-queried; and
   obtain the CNN feature of the target video frame by inputting the target video frame into a CNN for processing.

17. The non-transitory computer readable storage medium of claim 15, wherein the program instructions operable with the computer to obtain the first video frame from the plurality of sample video frames are operable with the computer to:
   obtain a CNN feature index of a sample video, the sample video comprising the plurality of sample video frames, the CNN feature index being indicative of a plurality of clusters formed by clustering of a CNN feature with a reduced dimension of the plurality of sample video frames, each cluster comprising a cluster center and a CNN feature with a reduced dimension of at least one sample video frame in the cluster;
   calculate a distance between the CNN feature with the reduced dimension of the target video frame and the cluster center of each of the plurality of clusters and determining a cluster with a cluster center having the shortest distance as a target cluster; and
   calculate a distance between the CNN feature with the reduced dimension of the target video frame and a CNN feature with a reduced dimension of each of the at least one sample video frame comprised in the target cluster, and determining a sample video frame, which corresponds to a CNN feature with a reduced dimension at the shortest distance, as the first video frame.

18. The non-transitory computer readable storage medium of claim 17, wherein the local feature of the target video frame comprises m first key points and m first feature descriptors corresponding to the m first key points, one first key point corresponds to one first feature descriptor, the local feature of the first video frame comprises n second key points and n second feature descriptors corresponding to the n second key points, one second key point corresponds to one second feature descriptor, m being a natural number greater than or equal to 2, and n being a natural number greater than or equal to 2, and wherein the program instructions operable with the computer to calculate the matching degree between the local feature of the first video frame and the local feature of the target video frame are operable with the computer to:

for each first feature descriptor, obtain a distance between each of the n second feature descriptors and the first feature descriptor to obtain n distances;

sort the n distances to form a sorting queue in order from large to small;

obtain last k distances in the sorting queue, k being a natural number greater than or equal to 2;

determine that the first feature descriptor is an effective descriptor matching the first video frame, according to the k distances; and determine the matching degree between the local feature of the first video frame and the local feature of the target video frame according to the number of effective descriptors in the m first feature descriptors.

19. The non-transitory computer readable storage medium of claim 17, wherein the program instructions are further operable with the computer to:

obtain a CNN feature of the plurality of sample video frames;

perform dimension reduction on the CNN feature of the plurality of sample video frames with a principal component analysis (PCA) matrix to obtain the CNN feature with the reduced dimension of the plurality of sample video frames;

perform k-means clustering on the CNN feature with the reduced dimension of the plurality of sample video frames to form a plurality of clusters, each cluster comprising a CNN feature with a reduced dimension of at least one sample video frame;

perform quantization compression on the CNN feature with the reduced dimension of the at least one sample video frame comprised in each cluster to obtain a compressed CNN feature corresponding to the cluster; and generate the CNN feature index of the sample video according to the plurality of clusters, the compressed CNN feature corresponding to each cluster, and the cluster center of each cluster.

20. The non-transitory computer readable storage medium of claim 15, wherein the target video frame belongs to a video to-be-queried, a playing time point of the target video frame in the video to-be-queried is a first playing time point, and the first video frame belongs to a target video in a sample video, wherein the program instructions operable with the computer to determine the first video frame as the duplicate video frame of the target video frame are operable with the computer to:

obtain a frame identifier (ID) of the first video frame; and search for a second playing time point in the target video corresponding to the frame ID of the first video frame, and determine a video frame at the second playing time point in the target video as a duplicate video frame of a video frame at the first playing time point in the video to-be-queried.

* * * * *